May 20, 1958 R. D. FLOOD ET AL 2,835,728

TELEVISION RECEIVER WITH COLOR SIGNAL GATE

Filed June 16, 1953 2 Sheets-Sheet 1

INVENTOR.
ROBERT D. FLOOD AND
LOREN R. KIRKWOOD

BY W. H. Sprague
ATTORNEY

TELEVISION RECEIVER WITH COLOR SIGNAL GATE

Filed June 16, 1953 2 Sheets-Sheet 2

INVENTORS
ROBERT D. FLOOD AND
LOREN R. KIRKWOOD

BY [signature]
ATTORNEY

United States Patent Office 2,835,728

Patented May 20, 1958

2,835,728

TELEVISION RECEIVER WITH COLOR SIGNAL GATE

Robert D. Flood and Loren R. Kirkwood, Haddonfield, N. J., assignors to Radio Corporation of America, a corporation of Delaware Application June 16, 1953, Serial No. 361,978

14 Claims. (Cl. 178—5.4)

This invention relates to apparatus for receiving color television signals and has particular reference to the circuits for processing color synchronizing signals.

In the type of color television system in accordance with the standards proposed by the National Television System Committee (NTSC) on February 2, 1953, a brightness or luminance signal having the general character of a conventional black and white television signal is transmitted together with a phase- and amplitude-modulated subcarrier wave having a nominal frequency which corresponds to one of the higher luminance signal frequencies. These video signals are transmitted together with the usual synchronizing signals for effecting synchronous deflection of an electron beam at both horizontal and vertical frequencies, and, in addition, with a color synchronizing signal. The color synchronizing signal is a burst of several cycles of a wave having the color subcarrier frequency and is transmitted on the back porch of the horizontal synchronizing signals.

At a receiver in such a color television system, it is necessary to separate the burst color synchronizing signal from the remainder of the composite television signal so that it may be used for phase comparison with the output of a reference frequency oscillator, the output of which is employed to synchronously demodulate the color subcarrier wave for the recovery of the color representative intelligence signals. Also, at such a receiver, it is customary to separate the color carrier wave and its side band frequencies from the remainder of the composite video signal so that it may be synchronously demodulated. The result of the synchronous demodulation of the color subcarrier wave are so-called color difference signals which, when combined with the luminance or brightness signal, produce respective signals representative of the primary colors in which the image reproduction is to be effected. The combined brightness and color difference signals are impressed upon the image reproducing apparatus respectively as three different video signals representing the image colors.

In the impression of the color signals upon the image reproducing apparatus, it is necessary, as in conventional black and white receivers employing A.-C. coupled video amplifiers, to effect a so-called D.-C. restoration or black level setting. In such color receivers, as in conventional black and white receivers, the D.-C. restorers connected at the respective inputs of the image reproducing apparatus for the different colors function to effect the desired level setting in response to the peaks or tips of the horizontal and vertical synchronizing signals.

It has been found that the demodulation of the burst color synchronizing signals in certain of the color representative channels produces signals which exceed in amplitude the peaks of the horizontal and vertical sync signals. If such demodulated burst signals were to be impressed upon the D.-C. restorers, malfunctioning of such apparatus would result, since the level at which the image reproducing apparatus would be required to function would not correspond to true black level of the image to be reproduced.

Still another function of the burst synchronizing signal is to control the operation of the synchronous color subcarrier wave demodulating apparatus for proper response to either color television signals of the character employed according to the proposed NTSC standards, or to conventional black and white video signals. In the case of a color signal, the burst synchronizing signal is present and in the case of a black and white signal, it is absent. It, accordingly, is desired that the synchronous demodulating apparatus be rendered operative when color television signals are being received and inoperative when black and white signals are being received.

Accordingly, it is an object of the present invention to provide improved apparatus for suitably utilizing the burst color synchronizing signal in a color television receiver of the type adapted to operate in a system in accordance with the presently proposed NTSC standards.

Another object of the invention is to provide apparatus for rendering unresponsive the color signal processing circuits of a color television receiver during any period in which the burst color synchronizing signal is being received.

Still another object of the invention is to simultaneously render one circuit responsive and another circuit unresponsive to the burst color synchronizing signal.

In accordance with the present invention, a color television receiver is provided with gating devices respectively in the color subcarrier wave demodulating circuit and the color subcarrier reference wave synchronizing circuit. The demodulator circuit gate is normally open and the synchronizing circuit gate is normally closed. Both of these gating devices are concurrently operated to their respective opposite states in response to a signal occurring substantially simultaneously with the horizontal synchronizing signals. By such means, the burst color synchronizing signal is prevented from traversing the synchronous demodulating apparatus and at the same time it is impressed upon the phase detecting apparatus by means of which the local color subcarrier wave reference frequency oscillator is maintained in synchronism and in phase with the received color subcarrier wave.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figure 1:
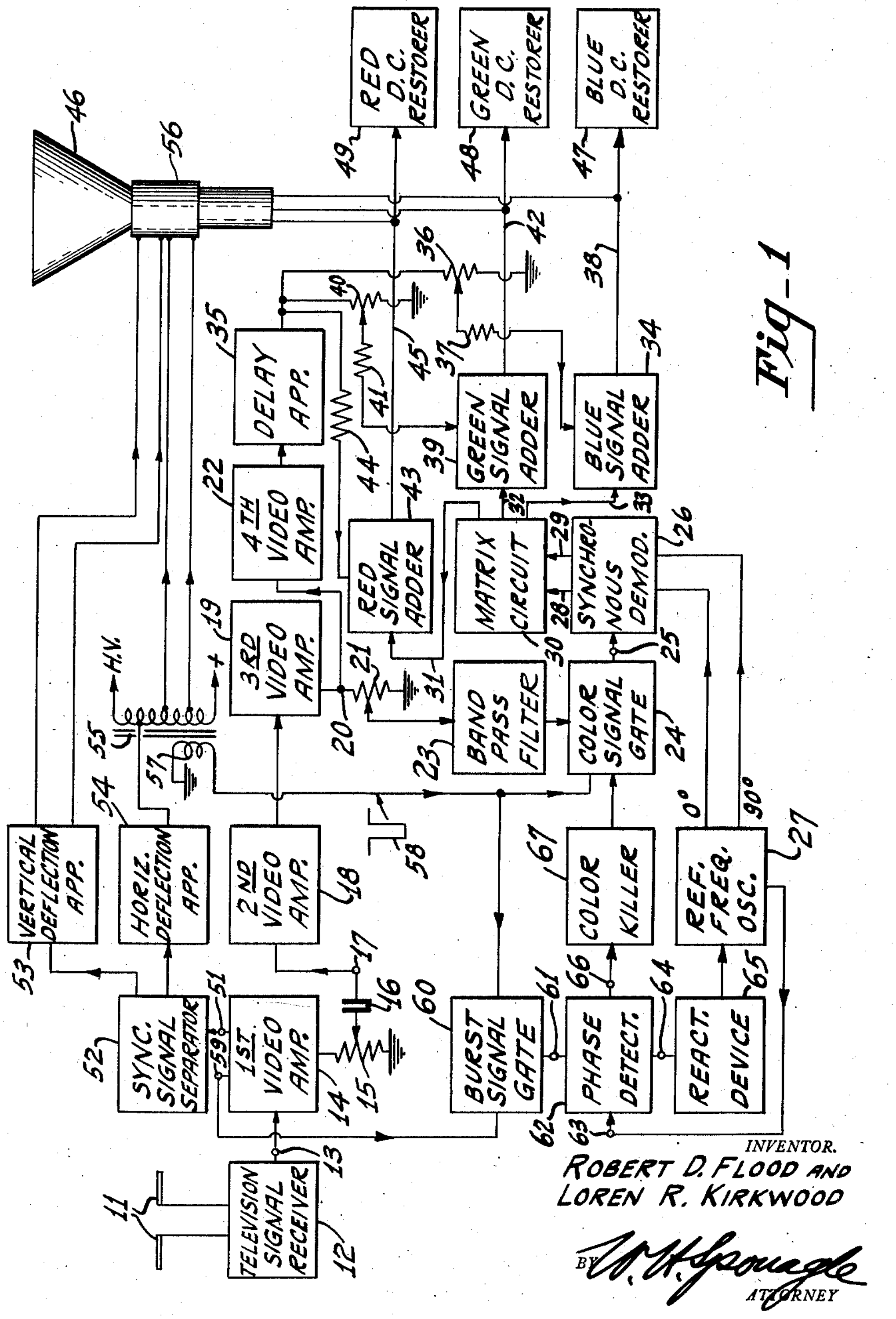
Figure 1 is a block circuit diagram of a color television receiver embodying the present invention.

Reference first will be made to Figure 1 of the drawings for a general description of a television receiver embodying the invention. The composite color television signal in accordance with the presently proposed NTSC standards is received by an antenna 11 and is impressed upon a television signal receiver 12. The television signal receiver may be entirely conventional including, for example, R. F. and I. F. amplifiers, a frequency converter or first detector and a signal or second detector. It, therefore, will be understood that there is derived at the output terminal 13 of the receiver 12 a composite television signal in accordance with the presently proposed NTSC standards. This signal accordingly includes a brightness or luminance signal component covering a band of frequencies of approximately 4 megacycles and made up of predetermined percentages of the red, green and blue color representative signals derived from a subject. In addition to the brightness or luminance signal component, the video signal also includes a chrominance signal component consisting of a phase- and amplitude-modulated color subcarrier wave having a nominal frequency of approximately 3.58 megacycles. The composite color video signal includes substantially all of one and a portion of the other of the sidebands of the color subcarrier wave. Additionally, the composite signal developed at the output terminal 13 includes the usual horizontal and vertical synchronizing signals. Finally, the signal also includes the burst of the color subcarrier wave frequency on the so-called back porch of the horizontal synchronizing signal waveforms.

The composite color television signal developed at the terminal 13 is impressed upon a first video amplifier stage 14. One output circuit with which the amplifier 14 is provided includes a potentiometer 15 preferably connected in the cathode circuit of an electron tube forming part of the first video amplifier stage and employed as a contrast control of the reproduced image. The potentiometer 15 is coupled by means including a capacitor 16 to the input terminal 17 of a second video amplifier stage 18, the output of which is, in turn, coupled to the input of a third video amplifier stage 19. The output circuit including terminal 20 of the third video amplifier stage also includes a potentiometer 21 preferably coupled in the cathode circuit of an electron tube forming part of the third video amplifier stage and employed as a chroma control by which to adjust the amplitude of the chrominance signal which is to be impressed upon the synchronous demodulators. Also, the output terminal 20 of the third video amplifier stage 19 is coupled to a fourth video amplifier stage 22.

Before describing the remainder of the luminance signal channel, a description will be given of the chrominance signal channel which is derived from the potentiometer 21 in the output circuit of the third video amplifier stage 19. The movable contact of the potentiometer 21 is coupled to a band pass filter 23. Generally, this filter is designed to pass frequencies within a band of from 2 to 4 megacycles. It is within this band of frequencies that the subcarrier wave and its sidebands lie. The band pass filter 23 is coupled to a color signal gating device 24. It will be understood that this device is normally operative to transfer signals from the band pass filter 23 to an output terminal 25.

The output terminal 25 is coupled to synchronous demodulating apparatus 26. It will be understood that usually the synchronous demodulating apparatus comprises two demodulators of the synchronous type in each of which the color subcarrier wave, together with its sidebands, are mixed with different phases of the reference frequency corresponding to the color subcarrier wave frequency. In the present case, the reference frequency oscillator 27 will be understood to operate with satisfactory stability at a frequency of substantially 3.58 megacycles corresponding to the color subcarrier wave frequency. Also, as indicated, there is derived from the oscillator, or auxiliary apparatus employed therewith, two different quadrature phases of the reference frequency wave. For convenience of reference, these two quadrature phases have been designated as 0° and 90°. As indicated, therefore, it will be understood that the synchronous demodulating apparatus functions in response to the color subcarrier wave signals developed at the terminal 25 in conjunction with two quadrature phases of the reference frequency wave derived from the oscillator 27 to produce two signals in the output circuits 28 and 29 respectively which correspond to the signals which were originally modulated on the color subcarrier wave at the transmitter.

The character of the demodulated signals in the output circuits 28 and 29 of the demodulating apparatus 26 will depend upon the phase relationship of the quadrature components of the reference frequency wave derived from the oscillator 27 relative to the phase of the burst color synchronizing signals. In the case where the demodulating apparatus 26 functions in accordance with the quadrature phase components related by 90° and 180°, respectively, to the burst frequency, the signals produced in the output circuits 28 and 29 correspond respectively in a general way to color difference signals. Such color difference signals, while not precisely representative of the subject color, may be combined with the luminance signal so as to produce color representative signals which may be employed to operate image reproducing apparatus with sufficient fidelity to provide satisfactory results.

However, since in accordance with the presently proposed NTSC standards the color subcarrier wave is modulated with quadrature phased components which are delayed respectively relative to the burst frequency by angles of 57° and 147°, a more faithful reproduction may be effected by operating the synchronous demodulating apparatus 26 by means of quadrature phase components of the reference frequency wave derived from the oscillator 27 which bear this angular relationship to the burst frequency. In such a case, the signals produced in the output circuits 28 and 29 of the demodulating apparatus 26 are not truly color difference signals, but are generally referred to as "I" and "Q" signals.

In order to produce true color difference signals from such "I" and "Q" signals, the demodulator output circuits 28 and 29 are coupled to a matrix circuit 30. This circuit functions to mix proper percentages and polarities of the "I" and "Q" signals derived from the demodulator output circuits 28 and 29 in accordance with the relationships established by the NTSC proposed standards so as to produce in the respective output circuits 31, 32 and 33 blue, green, and red color difference signals.

The blue color difference signal produced in the matrix output circuit 31 is impressed upon a blue signal adder 34. There also is impressed upon the blue signal adder a certain percentage of the luminance signal. This latter signal is derived from a delay device 35 coupled to the output of the fourth video amplifier stage 22. The delay device is necessary to insert a suitable time delay in the luminance signal channel to correspond with the time delay produced in the chrominance signal channel by reason of the filter apparatus, such as the band pass filter 23. Accordingly, the luminance signal is made to have the same phase as the color difference signals for combination in the signal adding apparatus. The desired percentage of the brightness signal for combination with the blue color difference signal is determined by the adjustment of a potentiometer 36 and is impressed upon the blue signal adder through a series resistor 37. The blue signal adder 34 is a device which performs an algebraic addition of the blue color difference signal and the luminance signal. Such an adder may comprise an electron tube, for example, upon the input circuit of which both of the signals to be added are impressed and the sum of which is developed in the output circuit of the tube. Accordingly, a blue color representative signal is produced in the output circuit 38 of the blue signal adder 34.

In a similar manner, the green color difference signal produced in the matrix output circuit 32 is impressed upon a green signal adder 39 for combination with the luminance signal impressed upon the green adder by means including a potentiometer 40 for properly proportioning the luminance signal and a series resistor 41. As a result, a green representative color signal is developed in the output circuit 42 of the green adder 39.

In a like manner, the matrix output circuit 33 is coupled to a red signal adder 43 for the impression thereon of the red color difference signal. The luminance signal is impressed upon the red adder by means including a series resistor 44. The reason that the entire luminance signal is impressed upon the red adder, whereas smaller percentages thereof are impressed upon the blue and green adders is that a red signal of greater magnitude is required to energize the red light producing apparatus of the image reproducing device.

The image reproducing device is a color kinescope 46. In the present instance, it will be assumed that the image reproducing device is a tri-color kinescope of the same general type as that described in a paper of H. B. Law titled "A three-gun shadow-mask color kinescope" and published in the Proceedings of the I. R. E., vol. 39, No. 10, October 1951, at page 1186. Such a color kinescope also forms the subject matter of U. S. Patent No. 2,595,548, granted May 6, 1952, to A. C. Schroeder and titled "Picture Reproducing Apparatus."

Such a kinescope includes three electron guns, or their equivalents, by which to produce three different electron beams which, upon impingement of the luminescent screen, effect the production of red, green and blue colored light, respectively. Accordingly, the blue color signal produced in the blue adder output circuit 38 is impressed upon a suitable electrode of the blue electron beam producing gun of the tri-color kinescope 46. In a similar manner, the green and red adder output circuits 42 and 45 are coupled respectively to the green and red electron guns of the tri-color kinescope 46.

In a somewhat conventional manner, the electron gun input circuits coupled respectively to the blue, green and red adder output circuits 38, 42, and 45 have connected thereto blue, green and red D.-C. restorers 47, 48 and 49. It will be understood that the D.-C. restorers are conventional apparatus including such components as a capacitor and a diode and arranged for operation to establish substantial cut-off of the associated electron beams in response voltages corresponding to the black representative video signals. The D.-C. restorers function to produce this type of result in response to the tips or maximum excursions of the sync signals forming part of the composite color television signal impressed upon the tri-color kinescope 46.

The color television system embodying the present invention also is provided with generally conventional apparatus for controlling the deflection of the electron beam components of the tri-color kinescope 46 so as to scan the usual substantially rectangular raster at the luminescent screen thereof. For this purpose, the composite color television signal produced at an output terminal 51 of the first video amplifier stage 14 is impressed upon a sync signal separator 52. This apparatus may be of a conventional type and functions to separate the horizontal and vertical synchronizing signals from one another and also from the video signal component of the composite signal. The vertical sync pulses are impressed upon vertical deflection apparatus 53 which functions in a conventional manner to produce a substantially sawtooth wave at vertical or field deflection frequency. In a somewhat similar manner, the separated horizontal sync signals are impressed upon horizontal deflection apparatus 54 for the production of a substantially sawtooth wave at horizontal or line deflection frequency. The horizontal deflection wave is impressed upon an output transformer 55. It will be understood that the vertical deflection circuit may also include a similar output transformer. The vertical and horizontal frequency sawtooth waves are impressed upon associated windings of a deflection yoke 56 with which the tri-color kinescope 46 is provided. By such means, the desired raster scanning deflection of the electron beam components is effected.

The horizontal deflection output transformer 55 also is provided with an auxiliary winding 57. This winding functions to develop pulses 58 of negative polarity during the retrace periods of the horizontal deflection system. The pulses 58 are employed in accordance with this invention to control the operation of two gating devices including the color signal gate 24 in a manner to be described presently.

The frequency and phase control of the reference frequency oscillator 27 is effected by means of the burst color synchronizing signal. It is necessary to separate the burst signal from the remainder of the composite color television signal in order to effect this control. Accordingly, the composite color television signal developed at another output terminal 59 of the first video amplifier stage 14 is impressed upon a burst signal gate 60. This gate normally is closed so that the signal which is impressed upon its input circuit is not transferred to the output circuit. The burst signal gate 60 is momentarily opened periodically in response to the impression upon the control circuit thereof of the control pulses 58 derived from the horizontal deflection circuit.

The output of the burst signal gate 60 is coupled to one input terminal 61 of a phase detector 62. The reference frequency wave derived from the oscillator 27 is impressed upon another input terminal 63 of the phase detector. Accordingly, during horizontal retrace intervals following the reception of the horizontal sync pulses, the burst signal gate 60 is momentarily rendered conducting to impress upon the phase detector input terminal 61 the burst of color synchronizing signal. The burst signal is thus compared in phase with the reference frequency wave impressed upon the other input terminal 63. Any difference in phase between these two waves is detected and effects the development at an output terminal 64 of the phase detector of a voltage which is representative of the sense and magnitude of the phase deviation.

The phase error voltage developed at the output terminal 64 of the phase detector 62 is impressed upon a reactance device 65 which may be of a conventional character in a manner to effect a variation of reactance in correspondence with the voltage derived from the phase detector 62. The reactance device thereby controls the phase and frequency of the reference frequency oscillator 27 to which it is coupled in a conventional manner.

The burst color synchronizing signal also is developed at another output terminal 66 of the phase detector 62. This terminal is connected to color killer apparatus 67. The output of the color killer apparatus is connected to a control circuit of the color signal gate 24 so as to control its operation in response to the presence or absence of a burst synchronizing signal in the received composite color television signal. During the times that the burst color synchronizing signal is being received, the color killer apparatus 67 functions to maintain the color signal gate 24 in an operative or conducting condition so that, so far as its control of this gate is concerned, the signals impressed upon it from the band pass filter 23 are transferred to its output circuit including the terminal 25. When the burst color synchronizing signal is absent from the received composite television signal, such as in the case when only black and white signals are being received, the color killer apparatus 67 functions to render the color signal gate 24 substantially nonconducting so that no signals are developed at the output terminal 25. By such means, it is seen that the entire chrominance signal channel is rendered inoperative so that the color kinescope 46 responds only to the luminance signals which correspond essentially to black and white video signals.

The color signal gate 24 also is momentarily rendered nonconducting in response to the gate control signal pulses 58 derived from the horizontal deflection circuit. This momentary interruption of the circuit through the gate 24 occurs during the period in which the burst color synchronizing signal is being received. By such means, it is seen that this signal is prevented from being transferred to the output terminal 25 from which it would be impressed upon the demodulating apparatus of the chrominance signal channel. As previously indicated, the demodulation of the burst color synchronizing signal may produce a false operation of the D.-C. restorers 47, 48, and 49.

Figure 2:
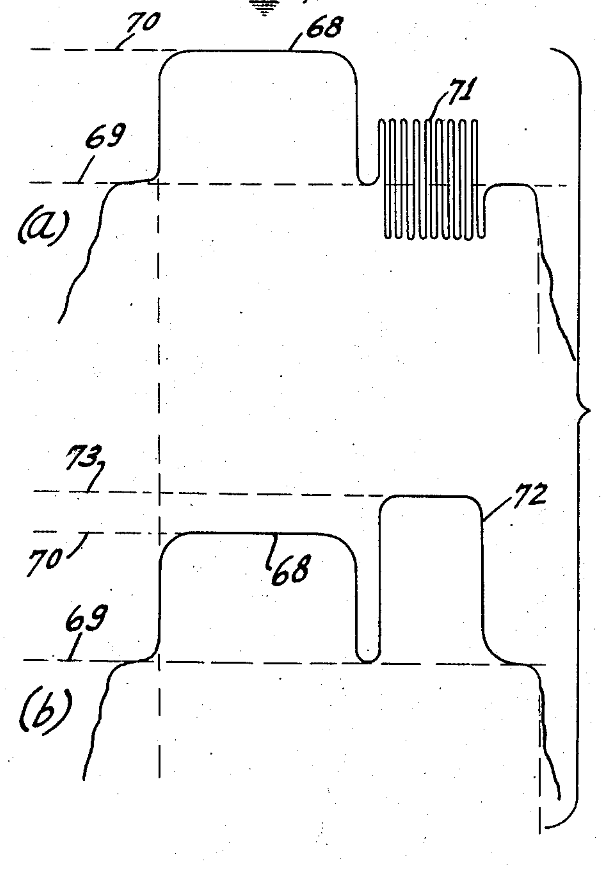
Figure 2 shows waveforms of typical synchronizing signals including the color synchronizing burst signal for reference in explaining the need for the present invention; and, Figure 3 is a schematic circuit diagram of that portion of the receiver shown in the block diagram of Figure 1 embodying an illustrative form of the present invention.

The manner in which such false operation of the D.-C. restorers can occur may be more readily seen from the waveforms of Figure 2. In Figure 2*a*, the horizontal sync pulse 68 extends from black level amplitude 69 to a super black amplitude level 70. The D.-C. restorers functioning in a conventional manner, tend to set themselves in response to the horizontal sync pulse amplitude 70 so that the electron beam components of the tri-color kinescope 46 are effectively blanked in response to signals having an amplitude 69 or greater.

Figure 2*a* also indicates the burst color synchronizing signal 71 which consists of several cycles of the color subcarrier wave frequency and has an A.-C. axis coinciding substantially with the black level amplitude 69.

By referring now to Figure 2*b*, there is a representation of a typical signal which might be impressed upon one or more of the D.-C. restorers 47, 48 and 49 of Figure 1 in the event that the burst color synchronizing signal 71 of Figure 2*a* were to be demodulated by the apparatus in the chrominance signal channel. The pulse 72 represents the demodulation signal corresponding to the burst color synchronizing signal 71 of Figure 2*a*. It is seen that the pulse 72 extends to an amplitude level 73 which is somewhat in excess of the maximum amplitude level 70 of the horizontal sync pulse 68. The impression of such a signal upon one or more of the D.-C. restorers would cause them to respond to a signal having amplitude 73 instead of one having an amplitude 70. Accordingly, such apparatus would be caused to operate in such a manner as to set a false D.-C. or black level for the operation of the tri-color kinescope 46.

Figure 3:
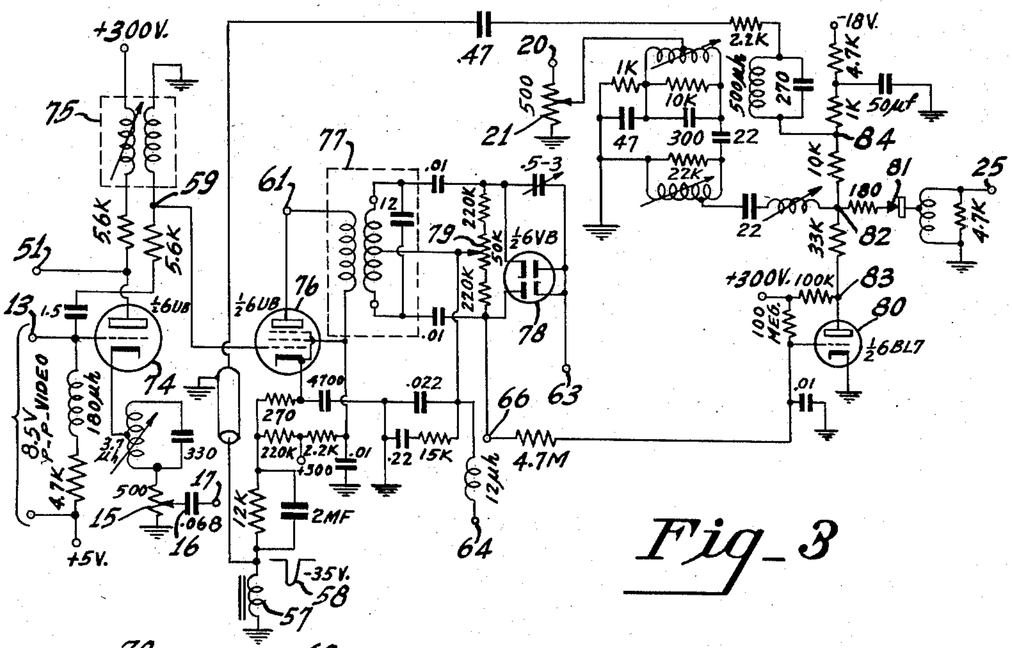

For the description of the particular circuits employed in an illustrative embodiment of the invention, reference now will be made to Figure 3 of the drawings. This description will not include reference to circuit details, which may be readily seen from the drawing. The values of the essential components are indicated and are in accordance substantially with a practical embodiment of the invention which has been successfully operated. In indicating these values, all resistance value are in ohms, all capacitance values less than 1.0 are in microfarads and greater than 1.0 are in micromicrofarads, unless otherwise noted. Also in a conventional manner, K, used in the values of some of the resistors, equals 1000 ohms. The first videto amplifier stage 14 of Figure 1 includes an electron tube 74, in the cathode circuit of which the contrast control potentiometer 15 is connected to the output terminal 17. The ouput terminal 51 for the sync signal separator is derived from the anode of the tube 74. Also connected in the anode circuit of this tube is a transformer 75, the secondary winding of which is coupled to the control grid of an electron tube 76 included in the burst signal gate 60 of Figure 1. The output circuit of the burst gate tube 76 includes a transformer 77 which is coupled to a double diode electron tube 78 forming part of the phase detector 62 of Figure 1. The output terminal 64 of the phase detector is derived from a potentiometer 79 employed to effect a balanced type of operation of the phase detector. As previously described, the terminal 64 is coupled to the reactance device so as to effect the desired phase and frequency control of the reference frequency oscillator 27 of Figure 1.

The other output terminal 66 of the phase detector is coupled to the control grid of an electron tube 80 comprising the color killer apparatus 67 of Figure 1. The concept of deriving a signal from a phase detector or frequency comparator for the control of color killer apparatus is the subject matter of a U. S. Patent No. 2,744,155, granted May 1, 1956, to Harry Kihn and titled "Color or Monochrome Television Receiving System."

The composite color television signal developed at the output terminal 20 of the third video amplifier stage 19 of Figure 1 is impressed by means of the chroma control potentiometer 21 upon the band pass filter 23 (Figure 1) which, in this embodiment of the invention, includes a crystal diode 81 comprising the color signal gate of Figure 1. There also is connected to the diode 81 a biasing potential, derived from a voltage divider terminal 82, which normally causes the diode to freely conduct to the output terminal 25 any signal impressed thereon from the band pass filter.

It also is to be noted that, so long as a burst color synchronizing signal is present in the composite color television signal, the burst is impressed upon the phase detector including the tube 78 so that there is developed at the output terminal 66 a negative voltage for impression upon the color killer tube 80. In this way, the color killer tube is maintained in a non-conducting state, or at least in a state of low conduction, thereby producing the described biasing potential for the crystal diode 81. Thus, the crystal diode 81 is maintained in a conducting condition. When the burst is absent from the composite television signal, as during black and white transmissions, a negative voltage is not developed at the terminal 66. The color killer tube 80 becomes conducting to lower the voltage at voltage divider terminal 83, thereby producing a negative voltage at the voltage divider terminal 82. In this way, the crystal diode 81, serving as the color signal gate, is rendered non-conducting, so that no signals are transferred to the output terminal 25 for impression upon the synchronous demodulator apparatus 26 of Figure 1.

The auxiliary winding 57 of the horizontal output transformer 55 of Figure 1 is coupled to the cathode of the burst gate tube 76. By means of the disclosed circuit components, the pulse 58 is at least partially integrated so that it causes the tube 76 to conduct momentarily for the transfer of the burst color synchronizing signal by way of output terminal 61 to the output transformer 77. As previously described, the separated burst is compared in phase, in a generally conventional manner by means including the tube 78, with the reference frequency wave injected at the input terminal 63. Any developed phase error signal is produced at the output terminal 64 for impression upon the frequency controlling apparatus, including the reactance device 65 of Figure 1.

The auxiliary winding 57 of the horizontal output transformer also is coupled to voltage divider terminal 84 for control of the crystal diode 81. By such means the negative pulses 58 are integrated by the illustrated circuit components and so alter the voltage at the voltage divider terminal 84 that a negative potential is produced at the voltage divider terminal 82 for impression upon the crystal diode 81 during the time that the burst synchronizing signal is being received over the circuit from the terminal 20. Conduction by the diode 81 thereby is stopped, which prevents the burst synchronizing signal from being impressed upon the output terminal 25 from which it would be transferred to the color subcarrier wave demodulating apparatus 26 of Figure 1. As previously described, such operation by the demodulating apparatus would result in the false operation of the D.-C. restorers 47, 48 and 49 of Figure 1.

Having thus described the invention, its scope is pointed out in the appended claims.

What is claimed is:

1. In a color television system employing a composite signal comprising, a luminance video signal, a chrominance video signal-modulated color subcarrier wave, and periodic color synchronizing signal bursts of unmodulated color subcarrier wave, a signal receiver comprising, means including a synchronous demodulator to recover said chrominance video signal from said color subcarrier wave for combination with said luminance video signal to represent the colors in which an image is to be reproduced, means normally effective to impress said composite signal upon said demodulator, and means coupled to said signal-impressing means and controlled by a signal during burst reception periods to render ineffective said signal-impressing means.

2. In a color television system employing a composite signal comprising, a luminance video signal, a chrominance video signal-modulated color subcarrier wave, and periodic color synchronizing signal bursts of unmodulated color subcarrier wave, a signal receiver comprising, means including a synchronous demodulator to recover said chrominance video signal from said color subcarrier wave for combination with said luminance video signal to represent the colors in which an image is to be reproduced, a normally open signal gate in circuit with said demodulator, means impressing upon said signal gate at least a portion of said composite signal including said chrominance video signal-modulated color subcarrier wave and said color synchronizing signal bursts, and means coupled to said signal gate and controlled by a signal during burst reception periods to close said signal gate.

3. In a color television system employing a composite signal comprising, a luminance video signal, a chrominance video signal-modulated color subcarrier wave, and periodic color synchronizing signal bursts of unmodulated color subcarrier wave, a signal receiver comprising, means including a synchronous demodulator to recover said chrominance video signal from said color subcarrier wave for combination with said luminance video signal to represent the colors in which an image is to be reproduced, a normally conducting signal gate in circuit with said demodulator, means impressing said composite signal upon said signal gate, and gate-controlling means coupled to said signal gate and controlled by a signal periodically to render said signal gate non-conducting for said color synchronizing signal bursts.

4. A color television receiver as defined in claim 3 wherein, said signal gate includes a uni-laterally conducting device, said uni-laterally conducting device being rendered normally conducting by means impressing thereon a voltage of a predetermined polarity, and means including a source of voltage pulses of the other polarity coupled to said uni-laterally conducting device to render it periodically nonconducting.

5. A color television receiver as defined in claim 4 wherein, said composite signal includes synchronizing signal for the control of raster scanning deflection apparatus, and means deriving said voltage pulses from said deflection apparatus.

6. In a color television system employing a composite signal comprising, a luminance video signal, a chrominance video signal-modulated color subcarrier wave, and periodic color synchronizing signal bursts of unmodulated color subcarrier wave, a signal receiver comprising, means including a synchronous demodulator to recover said chrominance video signal from said color subcarrier wave for combination with said luminance video signal to represent the colors in which an image is to be reproduced, a reference frequency oscillator coupled to said demodulator and operating substantially at said subcarrier wave frequency, frequency control apparatus coupled to said oscillator, means responsive to phase differences between said reference frequency and said periodic bursts of said unmodulated color subcarrier wave coupled to operate said frequency control apparatus, a normally conducting input circuit for said demodulator, a normally non-conducting input circuit for said phase difference responsive means, means impressing said composite signal upon said input circuits, and signal-controlled means operative during burst reception periods to render non-conducting said normally conducting input circuit and to render conducting said normally non-conducting input circuit.

7. In a color television system employing a composite signal comprising, a luminance video signal, a chrominance video signal-modulated color subcarrier wave, and periodic color synchronizing signal bursts of unmodulated color subcarrier wave, a signal receiver comprising, means including a synchronous demodulator to recover said chrominance video signal from said color subcarrier wave for combination with said luminance video signal to represent the colors in which an image is to be reproduced, a reference frequency oscillator coupled to said demodulator and operating substantially at said subcarrier wave frequency, frequency control apparatus coupled to said oscillator, said frequency control apparatus being responsive to detected phase differences between said reference frequency and said periodic bursts of unmodulated color subcarrier wave, a normally open signal gate in circuit with said demodulator, a normally closed signal gate in circuit with said frequency control apparatus, means impressing said composite signal upon said signal gates, and gate-controlling means controlled by a signal during burst reception periods to close said normally open signal gate and to open said normally closed signal gate.

8. A color television receiver as defined in claim 7 wherein, said normally open gate includes a diode, said normally closed gate includes a grid controlled electron tube, and said gate controlling means comprises a source of voltage pulses.

9. A color television receiver as defined in claim 8 wherein, said composite signal includes synchronizing signals for the control of raster scanning deflection apparatus, and said gate controlling voltage pulse source comprises means coupled to said deflection apparatus.

10. In a color television system employing a composite signal comprising, a luminance video signal, a chrominance video signal-modulated color subcarrier wave, and periodic color synchronizing signal bursts of unmodulated color subcarrier wave, a signal receiver comprising, means including a demodulator to recover said chrominance video signal from said color subcarrier wave for combination with said luminance video signal to represent the colors in which an image is to be reproduced, an input circuit for said demodulator, means impressing said composite signal upon said input circuit, means developing a disabling signal and responsive to the presence of said color synchronizing signal bursts to develop an enabling signal, means coupled to said input circuit to control the conductivity of said input circuit, means coupling said signal-developing means to said conductivity control means so that said enabling signal renders said demodulator input circuit conducting and said disabling signal renders said demodulator input circuit non-conducting, and means controlled by a signal during burst reception periods to render said demodulator input circuit non-conducting.

11. In a color television system employing a composite signal comprising, a luminance video signal, a chrominance video signal-modulated color subcarrier wave, and periodic color synchronizing signal bursts of unmodulated color subcarrier wave, a signal receiver comprising, means including a synchronous demodulator to recover said chrominance video signal from said color subcarrier wave for combination with said luminance video signal to represent the colors in which an image is to be reproduced, a reference frequency oscillator coupled to said demodulator and operating substantially at said subcarrier wave frequency, frequency control apparatus coupled to said oscillator, said frequency control apparatus being responsive to detected phase differences between said reference frequency and said periodic bursts of unmodulated color subcarrier wave, a normally open signal gate in circuit with said demodulator, a normally closed signal gate in circuit with said frequency control apparatus, means impressing said composite signal upon said signal gates, gate-controlling means controlled by a signal during burst reception periods to close said normally open signal gate and to open said normally closed signal gate, and means responsive to an absence of said color synchronizing signal bursts to render non-conducting said normally conducting input circuit.

12. A color television receiver as defined in claim 11 wherein, said composite signal includes synchronizing signals for the control of raster scanning deflection apparatus, and said gate controlling means comprises a source of flyback pulses coupled to said deflection apparatus.

13. In a color television system employing a composite signal comprising, a luminance video signal, a chrominance video signal-modulated color subcarrier wave, and periodic color synchronizing signal bursts of unmodulated color subcarrier wave, a signal receiver comprising, means including a demodulator to recover said chrominance video signal from said color subcarrier wave for combination with said luminance video signal to represent the colors in which an image is to be reproduced, an input circuit for said demodulator, means impressing said composite signal upon said input circuit, means developing a disabling signal and responsive to the presence of said color synchronizing signal bursts to develop an enabling signal, means coupled to said input circuit to control the conductivity of said input circuit, and means coupling said signal developing means to said conductivity control means so that said enabling signal renders said demodulator input circuit conducting and said disabling signal renders said demodulator input circuit non-conducting.

14. In a color television system employing a composite signal comprising a luminance video signal, a chrominance video signal-modulated color subcarrier wave, and periodic color synchronizing signal bursts of unmodulated color subcarrier wave, a signal receiver comprising, means including a demodulator to recover said chrominance video signal from said color subcarrier wave for combination with said luminance video signal to represent the colors in which an image is to be reproduced, a normally conducting input circuit including a diode for said demodulator, means impressing said composite signal upon said input circuit, an electron tube coupled to said diode for the control of a bias voltage for said diode, and signal-controlled means varying the conductivity of said bias control tube in accordance with the presence or absence of said color synchronizing signal bursts so as to render nonconducting said normally conducting input circuit in the absence of said color synchronizing signal bursts.

References Cited in the file of this patent

UNITED STATES PATENTS 2,657,253 Bedford --------------- Oct. 27, 1953